United States Patent [19]

Hannewald

[11] Patent Number: 5,071,103

[45] Date of Patent: Dec. 10, 1991

[54] THROTTLE-VALVE CONNECTING PIECE

[75] Inventor: Thomas Hannewald, Griesheim, Fed. Rep. of Germany

[73] Assignee: VDO Adolf Schindling AG, Frankfurt am Main, Fed. Rep. of Germany

[21] Appl. No.: 643,568

[22] Filed: Jan. 18, 1991

[30] Foreign Application Priority Data

Feb. 26, 1990 [DE] Fed. Rep. of Germany ....... 4006041

[51] Int. Cl.[5] ............................................ F16K 1/22

[52] U.S. Cl. .................................... 251/305; 251/285

[58] Field of Search ................................ 251/285, 305

[56] References Cited

U.S. PATENT DOCUMENTS 2,412,021 12/1946 Weabley ............................ 251/285

2,414,947 1/1947 Heinze ............................ 251/285 X 4,705,063 11/1987 Robinson ........................ 251/285 X 4,721,281 1/1988 Kratt et al. ..................... 251/285 X

*Primary Examiner*—John C. Fox

*Attorney, Agent, or Firm*—Martin A. Farber

[57] ABSTRACT

A desired-value transmitter (2) is flanged onto a throttle-valve connecting piece (1), the desired-value transmitter having a setting shaft (5) aligned with a throttle-valve shaft (3). The setting shaft (5) engages in rotatable manner via a pin (9) into a bearing bushing (11) which is also rotatably mounted within a mounting hole (10) in the throttle-valve shaft (3). In this way, capacity for rotation of the adjusting shaft (5) with respect to the throttle-valve shaft (3) is doubly assured. Supporting of the setting shaft within the housing is unnecessary on the side facing the throttle-valve shaft (3).

9 Claims, 1 Drawing Sheet

Fig. 1
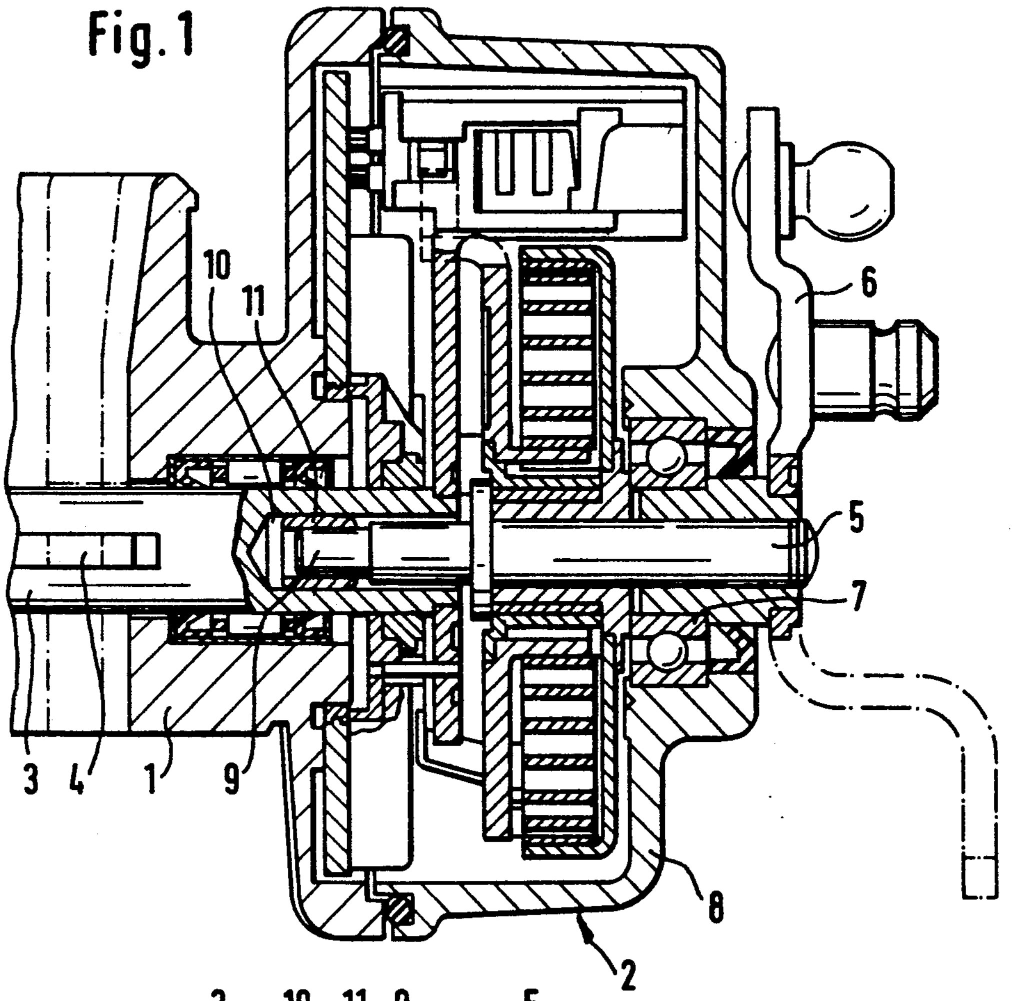
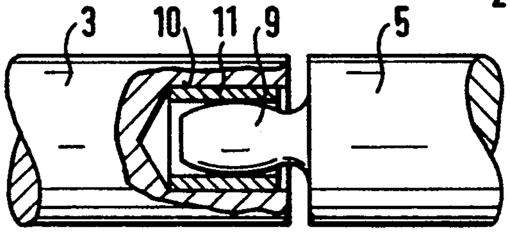
Fig. 2
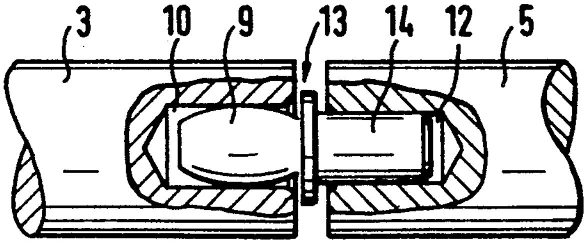
Fig. 3

THROTTLE-VALVE CONNECTING PIECE

FIELD AND BACKGROUND OF THE INVENTION

The present invention relates to a throttle-valve connecting piece having a desired-value transmitter which is flanged thereon on one side, the connecting piece having a setting shaft which is connected to a setting lever and is mounted on two bearings.

Such throttle-valve connecting pieces are present in motor vehicles in which the throttle valve is so developed that it can be adjusted by a motor, for instance for speed control or idling control.

In throttle-valve connecting pieces of this type, the throttle-valve shaft must not be connected fixed for rotation with the setting shaft, so that the desired value of the desired-value transmitter cannot be shifted at the same time by the movements of the throttle-valve shaft. If the setting shaft and the throttle valve are connected to each other fixed for rotation, then a throttle valve moving in the open direction due to an error would necessarily set the desired value higher, and complete opening of the throttle valve would result. In the case of such throttle-valve connecting pieces, the mounting of the setting shaft affords difficulties since there is very little space in the engine compartment in the region of the throttle-valve connecting piece. The desired-value transmitter must therefore be as compact as possible. The space for the mounting of the setting shaft on the throttle-valve side could be saved if the setting shaft were rigidly connected to the throttle-valve shaft, or if the latter were made of one piece with the setting shaft. In such case, however, the above-mentioned effect would occur, namely of the throttle-valve shaft displacing the desired value in the desired-value transmitter, so that this possibility of saving space does not enter into consideration.

SUMMARY OF THE INVENTION

It is an object of the invention so to develop a throttle-valve connecting piece of the above-mentioned type that it is as compact as possible, but wherein coupling of the setting shaft to the throttle-valve shaft is avoided.

According to the invention, an end of the setting shaft (5) which faces the throttle-valve shaft (3) is mounted in or on the throttle-valve shaft (3) in such a manner that it can turn with respect to the throttle-valve shaft (3).

As a result of this development, mounting of the setting shaft on the side facing the throttle-valve shaft can be dispensed with since the setting shaft is held on one side by the throttle-valve shaft. Turning of the setting shaft by the throttle-valve shaft is, however, impossible since the setting shaft is mounted rotatably in the throttle-valve shaft. Due to the invention, the size of the throttle-valve connecting piece can be reduced without any disadvantages from a safety standpoint occurring as a result thereof.

Particularly high assurance against raising of the throttle valve caused by an error can be obtained if a mounting of the setting shaft (5) in or on the throttle-valve shaft (3) has two pairs of mounting surfaces which are rotatable with respect to each other. Such a mounting is redundant. Should a blocking of two associated mounting surfaces occur, then the two other mounting surfaces of the other pair of mounting surfaces can turn with respect to each other so that the rotatable mounting is retained.

The throttle-valve connecting piece is developed in a structurally particularly simple manner if, in accordance with one advantageous embodiment of the invention, the setting shaft (5) engages via a journal pin (9) in rotatable manner into a bearing bushing (11) which, in its turn, is arranged in rotatable manner in a mounting hole (10) in the throttle-valve shaft (3).

Misalignments between the setting shaft and the throttle-valve shaft can be compensated for by making the journal pin (9) in barreled shape.

The overall manufacturing cost is particularly low if the bearing bushing (11) consists of a bearing metal. In this way, excellent friction characteristics can be achieved between the journal pin and the bearing bushing on the one hand, and between the bearing bushing and the wall of the mounting hole, on the other hand.

Instead of making the journal pin in barrelled shape in order to compensate for misalignments, the bearing bushing (11) can also be made barrel-shaped on its outside.

Another embodiment of the invention which also has two pairs of mounting surfaces which can turn independently of each other is constructed such that each of the facing end surfaces of throttle-valve shaft (3) and the setting shaft (5) are provided, aligned with each other, with a mounting hole (10, 12) and a mounting pin (13) engaging rotatably into the two mounting holes (10, 12).

The setting shaft is reliably held, without slight misalignments having a disturbing effect, if, in accordance with another further development of the invention, the mounting pin (13) is mounted in one mounting hole (10) with a barrel-shaped journal pin (9), and in the other mounting hole (12) with a cylindrical journal pin (14).

BRIEF DESCRIPTION OF THE DRAWING

With the above and other objects and advantages in view, the present invention will become more clearly understood in connection with the detailed description of three preferred embodiments for the further clarification of its basic principle, when considered with the accompanying drawing, of which:

FIG. 1 is a section through an edge region of a throttle-valve connecting piece of the invention, having a desired-value transmitter;

FIG. 2 is a side view of the region of connection of a setting shaft to a throttle-valve shaft of the throttle-valve connecting piece in an embodiment which is modified with respect to FIG. 1; and FIG. 3 is a side view of a third embodiment of a setting shaft and a throttle-valve shaft of the throttle-valve connecting piece.

DETAILED DESCRIPTION OF THE PREFERRED EMBODIMENTS

FIG. 1 shows, in part, a throttle-valve connecting piece 1 to which a desired-value transmitter 2 is flanged. In the throttle-valve connecting piece 1 there is rotatably mounted a throttle-valve shaft 3 on which a throttle valve 4 is mounted.

Aligned with the throttle-valve shaft 3, a setting shaft 5 is arranged in the desired-value transmitter 2, the setting shaft 5 being connected, fixed for rotation, with an adjusting lever 6 by which the desired-value transmitter 2 is adjusted in order to establish a specific desired value. There is not shown in the drawing a setting motor which is arranged on the side of the throttle-valve connecting piece 1 opposite the desired-value transmitter 2 and which adjusts the throttle-valve shaft 3 in accordance with the values preset by the desired-value transmitter 2.

The setting shaft 5 is mounted on the side facing away from the throttle-valve shaft 3 in customary manner by means of an antifriction bearing 7 within the housing 8 of the desired-value transmitter 2. On its side facing the throttle-valve shaft 3, the setting shaft 5 engages via a journal pin 9 into a mounting bore 10 which extends from the end of the shaft 3 into the throttle-valve shaft 3. On the journal pin 9, which is cylindrical in this embodiment, there is seated a bearing bushing 11 which consists of a bearing metal and has a barrelled outer surface.

The tolerances of the structural parts in the connecting region between the throttle-valve shaft 3 and the setting shaft 5 are such that the journal pin 9 turns in the bearing bushing 11 upon relative movement between the setting shaft 5 and the throttle-valve shaft 3. However, if seizing occurs in this region then the bearing bushing 11 is able to turn within the mounting hole 10 together with the journal pin 9.

In the embodiment according to FIG. 2, the journal pin 9 of the setting shaft 5 has a barrelled surface in order to compensate for misalignments. The bearing bushing 11 in the mounting hole 10 is cylindrical inside and outside. Exactly as in the case of the embodiment explained above, the journal pin 9 normally rotates within the bearing bushing 11, but if movement is difficult in this region, the bearing bushing 11 can also turn within the mounting hole 10.

In accordance with FIG. 3, a mounting hole 12 is also provided in the end surface of the setting shaft 5, aligned with the mounting hole 10. The barrelled pin 9 of the mounting stud 13 is seated rotatably in the mounting hole 10 while on its opposite side a cylindrical pin 14 is rotatably seated in a mounting hole 12. In this way there are again obtained two mounting places so that in the event of the blocking of one mounting place, the other one can permit rotary movement.

In the embodiments shown in FIGS. 1 and 2, the setting shaft 5 engages by a pin 9 into the mounting hole 10 in the throttle-valve shaft 3. A kinematic reversal is, of course, also possible in accordance with which a pin of the throttle-valve shaft 3 engages into the setting shaft. It is also conceivable that the setting shaft does not engage into the throttle-valve shaft but over it.

I claim:

1. A connection system including a throttle-valve connecting piece operative for connecting a desired-value transmitter of a motor to a setting shaft, wherein the transmitter is flanged thereon on one side, and the setting shaft is connected to a setting lever and is mounted on two bearings; and wherein, in the system, an end of the setting shaft which faces the throttle-valve shaft is mounted lapping the throttle-valve shaft, the system including means operative with the connection piece for allowing rotation of the setting shaft relative to the throttle-valve shaft.

2. A system according to claim 1, wherein a mounting of the setting shaft lapping the throttle-valve shaft has two pairs of mounting surfaces which are rotatable with respect to each other.

3. A system according to claim 2, further comprising a journal pin and a bearing housing, there being a mounting hole in the throttle valve shaft; and wherein the setting shaft engages via the journal pin rotatably into the bearing bushing; and the bushing is disposed rotatably in the mounting hole in the throttle-valve shaft.

4. A system according to claim 1, further comprising a journal pin and a bearing housing, there being a mounting hole in the throttle valve shaft; and wherein the setting shaft engages via the journal pin rotatably into the bearing bushing; and the bushing is disposed rotatably in the mounting hole in the throttle-valve shaft.

5. A system according to claim 3, wherein the journal pin has a barrelled shape.

6. A system according to claim 3, wherein the bearing bushing is made of a bearing metal.

7. A system according to claim 3, wherein the bearing bushing is barrel-shaped on its outside.

8. A system according to claim 3, further comprising a mounting pin wherein said journal pin forms a part of the mounting pin, there being a second mounting hole located in the setting shaft; and wherein said mounting holes are arranged relative to each other in the respective facing end surfaces of the throttle-shaft and the setting shaft aligned with each other; and the mounting pin engages rotatably into both of said mounting holes.

9. A system according to claim 8, wherein said journal pin is barrel-shaped, said mounting pin further comprising a cylindrical journal pin;

said mounting pin is mounted in one mounting hole of the throttle-valve shaft by means of said barrel-shaped journal pin; and said mounting pin is mounted in the mounting hole of said setting shaft by means of said cylindrical journal pin.

* * * * *